United States Patent Office 2,984,629
Patented May 16, 1961

2,984,629
AQUEOUS DISPERSIONS OF PYROGENIC SILICA

Kenneth A. Loftman, Holbrook, and Joseph R. Thereault, Allston, Mass., assignors to Cabot Corporation, Boston, Mass., a corporation of Delaware No Drawing. Filed Nov. 4, 1957, Ser. No. 694,120

3 Claims. (Cl. 252—313)

This invention relates generally to a method of preparing aqueous dispersions of metal oxides, and has particular reference to a method of preparing an aquasol with relatively high concentration of finely-divided silica.

There are many industrial applications for silicas of extremely fine particle size, in which it is convenient to apply the silica in the form of an aqueous dispersion. Such applications include non-slip floor waxes, foamed rubber latices, coatings for reproduction paper, wool spinning, and soil resistant compounds for textile fibers. Silica sols of the precipitated type, that is, formed by the treatment of an aqueous solution of a soluble silicate with an acid, containing up to 30% silica by weight, are currently available for these uses.

There has recently become available another type of finely-divided silica formed by the vapor phase hydrolysis of a silicon halide at high temperatures (about 1100° C.). This method of formation results in high chemical purity, extreme fineness, and discreteness of particles, high surface area (up to 200 square meters per gram) and unusual surface properties.

Although pyrogenic silicas have been found to give properties superior to precipitated silicas in many applications, it has heretofore been impossible to incorporate them into aquasols in concentrations greater than about 15%, since at higher concentrations gelling of the sol occurs, either immediately or on storage for a short time, rendering the dispersions unsatisfactory for use. For many applications an aquasol containing only 15% silica is unsuitable or undesirable because of the great amount of water present.

The principal object of the present invention is to provide an aquasol containing up to 40% pyrogenic silica which will not gel during normal periods of storage.

A further object of the invention is to provide a method of incorporating up to 40% of pyrogenic silica into an aquasol in a manner such that gelation is prevented during either mixing or subsequent storage and handling.

Other objects of the invention will be obvious to one skilled in the art from the following description of a specific embodiment thereof.

In accordance with this invention, I have found that up to 40% by weight of pyrogenic silica may be incorporated into an aquasol without gelation occurring, provided that the silica is suitably agglomerated prior to its addition to the water, with careful control of the pH of the dispersion, and with the addition of a suitable dispersing agent at the appropriate time in the mixing process.

For satisfactory dispersion, I have found that the pyrogenic silica should have a certain minimum degree of agglomeration in the dry form. Pyrogenic silica, normally having an apparent bulk density of about 2.5 pounds per cubic foot, can be agglomerated to the required degree by rolling in a drum with a compacting device, such as a freely-rotating cylinder. With such a device the apparent bulk density may be increased to 6 to 15 pounds per cubic foot, which has been found satisfactory for the present process.

The silica so agglomerated may then be dispersed into water in a homogenizer, a colloid mill, a pebble mill or an attrition mill by the following procedure. The mill is charged with the desired quantity of water, and the agglomerated silica is added slowly to the water while the mill is operating. When a concentration of about 15% by weight of silica is reached, sufficient alkali hydroxide is added to adjust the pH to between about 8.5 and 10.5, and about 1% by weight of a dispersing agent, based on the weight of the silica in the dispersion, is also added to the aquasol. (If the base or dispersing agent is to be added in a water solution, the amount of water therein must be omitted from the original water charged to the mill.)

Thereafter more silica may be added slowly, while grinding continues, until the viscosity increases sharply. This occurs at a silica concentration of about 20 to 25%. At this time more base is added to the mixture in an amount sufficient to return the pH to a value within the previously mentioned range, and more dispersing agent in an amount sufficient to return the concentration thereof to about 1% by weight of the total silica in the dispersion.

By further additions of silica to a point of sharply increasing viscosity, followed by addition of base and dispersing agent to return the concentration of each to about 1% by weight of the total silica, stable dispersions containing up to 40% by weight of pyrogenic silica may be obtained.

The dispersing agents suitable for use with the present invention are, in general, salts of partially polymerized aryl sulfonic acids and salts of alkyl aryl sulfonic acids. In particular, the following dispersing agents have been found suitable: Belloid TD, poly methylene bis-naphthalene sodium sulfonate, manufactured by the Alrose Chemical Company; Tamol N, a neutral sodium salt of a condensed aryl sulfonic acid, manufactured by Dewey & Almy Chemical Company; Daxad 11, a sodium salt of polymerized alkyl naphthalene sulfonic acid, manufactured by Rohm & Haas Company; and Darvan #1, a sodium salt of an aryl sulfonic acid, manufactured by R. T. Vanderbilt Company.

In a specific example of the teachings of this invention, a Szegvari Attritor, manufactured by Union Process Company of Akron, Ohio, was charged with 1500 grams of water. With the mill operating, 265 grams of agglomerated pyrogenic silica, having a particle size of about 0.015 to 0.020 micron and a bulk density of about 8 pounds per cubic foot were added giving a solids content of 15%. After the silica was thoroughly dispersed, which took about 15 minutes, 2.65 grams of sodium hydroxide in a 40% solution, and 2.65 grams of Belloid TD in a 40% water solution were added, and milling continued. More silica was then slowly added. After 446 grams of silica had been added, the viscosity of the mixture began to increase markedly. At this time 1.81 grams of sodium hydroxide and 1.81 grams of Belloid TD were added, to bring their concentration to about 1% by weight of the silica present. As milling continued, a substantial reduction in viscosity occurred. Silica was again added slowly, until the viscosity of the mixture again increased substantially, which occurred when the total silica in the dispersion reached 556 grams, corresponding to a concentration of 27%. At this time 1.1 grams of sodium hydroxide and 1.1 grams of Belloid TD were added, and again a substantial reduction on viscosity occurred. Silica was again added slowly, and when the total silica in the dispersion reached 643 grams, corresponding to a concentration of 30%, 0.87 gram of NaOH and 0.87 gram of Belloid TD were added. Thereafter the mixture was ground in the mill for about one hour, removed, and placed in a storage container. After 7 months, no gelation of the mixture had occurred.

Other dispersions made by the above procedure, containing as much as 40% silica, have showed no gelation after 3 months' storage.

Although the above procedure is particularly adaptable for making high concentration dispersions of pyrogenic silica, it is also adaptable to making dispersions of finely-divided precipitated or wet process silica.

Since certain obvious changes may be made in the invention without departing from the scope thereof, it is intended that all matter contained herein be interpreted in an illustrative and not in a limiting sense.

We claim:

1. The method of forming a stable aqueous dispersion of pyrogenic silica from dry discrete particles of a 0.010–0.025 micron average diameter comprising the steps of mechanically working said silica in the dry form until the apparent bulk density of same has increased to betwen about 6 and about 15 lbs./cu. ft. due to particle agglomeration therein, mixing the dry agglomerated silica with water, and subjecting the resulting mixture to high shear in the presence of (1) sufficient alkali hydroxide to bring the pH of said mixture to between about 8.5 and 10.5 and (2) a dispersing agent selected from the group consisting of salts of an aryl sulfonic acid and an alkyl aryl sulfonic acid.

2. The method of forming a stable aqueous dispersion of pyrogenic silica which comprises the steps of rolling dry discrete pyrogenic silica particles of an average diameter of from about 0.010 to about 0.025 micron in a compacting drum, thereby increasing the apparent bulk density of said particles to from about 6 to about 15 lb./cu. ft., and adding to a grinding mill charged with water alternately, in increments and while grinding, (1) said dry silica particles of increased apparent bulk density and (2) a dispersing agent selected from the group consisting of salts of an aryl sulfonic acid and alkyl aryl sulfonic acid together with an alkali metal hydroxide, until a stable dispersion is formed having a total pyrogenic silica content of at least 30% by weight and a pH of between about 8.5 and 10.5.

3. The method of forming a stable aqueous dispersion of pyrogenic silica having a particle size of 0.010 to 0.025 micron, comprising the steps of agglomerating said particles by mechanically densifying said silica to a density of between 6 and 15 pounds per cubic foot, and alternately mixing quantities of said densified silica with water until a substantial increase in viscosity occurs followed by lowering the viscosity of the mixture by high shear grinding in the presence of between about 0.5% and 2.5% by weight of the silica present of a dispersing agent selected from the group consisting of salts of an aryl sulfonic acid and an alkyl aryl sulfonic acid and between about 0.5% and 1.5% by weight of the silica present of an alkali metal hydroxide.

References Cited in the file of this patent

UNITED STATES PATENTS

| | | |
|---|---|---|
| 1,969,242 | Szegvari | Aug. 7, 1934 |
| 2,561,304 | Hazel | July 17, 1951 |
| 2,726,961 | Iler | Dec. 13, 1955 |
| 2,741,600 | Allen | Apr. 10, 1956 |
| 2,787,968 | Luvisi | Apr. 9, 1957 |

FOREIGN PATENTS

| | | |
|---|---|---|
| 713,211 | Great Britain | Aug. 4, 1954 |